(No Model.)  H. B. VAN BENTHUYSEN.  5 Sheets—Sheet 2.
PUDDLING MACHINE.

No. 291,963.  Patented Jan. 15, 1884.

Witnesses  Inventor
Jesse Hall Jr  Henry B. Van Benthuysen
James W. Pennypacker (No Model.)  
H. B. VAN BENTHUYSEN.  
PUDDLING MACHINE.

No. 291,963. Patented Jan. 15, 1884.

Witnesses  
Jesse Hall Jr  
James W. Pennypacker

Inventor  
Henry B. Van Benthuysen (No Model.)  H. B. VAN BENTHUYSEN.  5 Sheets—Sheet 4.

PUDDLING MACHINE.

No. 291,963.  Patented Jan. 15, 1884.

Witnesses
Jesse Hall Jr
James W. Pennypacker

Inventor
Henry B. Van Benthuysen (No Model.)

H. B. VAN BENTHUYSEN.
PUDDLING MACHINE.

No. 291,963. Patented Jan. 15, 1884.

5 Sheets—Sheet 5.

Witnesses
Jesse Hall Jr
James W. Pennypacker

Inventor
Henry B. Van Benthuysen

UNITED STATES PATENT OFFICE.

HENRY B. VAN BENTHUYSEN, OF PHŒNIXVILLE, PENNSYLVANIA.

PUDDLING-MACHINE.

SPECIFICATION forming part of Letters Patent No. 291,96?, dated January 15, 1884.

Application filed August 23, 1883. (No model.)

*To all whom it may concern:*

Be it known that I, HENRY B. VAN BENTHUYSEN, a citizen of the United States, residing in Phœnixville, Chester county, Pennsylvania, have invented certain Improvements in Puddling-Machines, of which the following is a specification.

My invention relates to certain improvements in machines used for puddling or converting cast-iron into wrought-iron by motive power.

The object of my invention is to simplify the construction, lessen the cost, and render such machines more efficient and durable.

Figure 1:
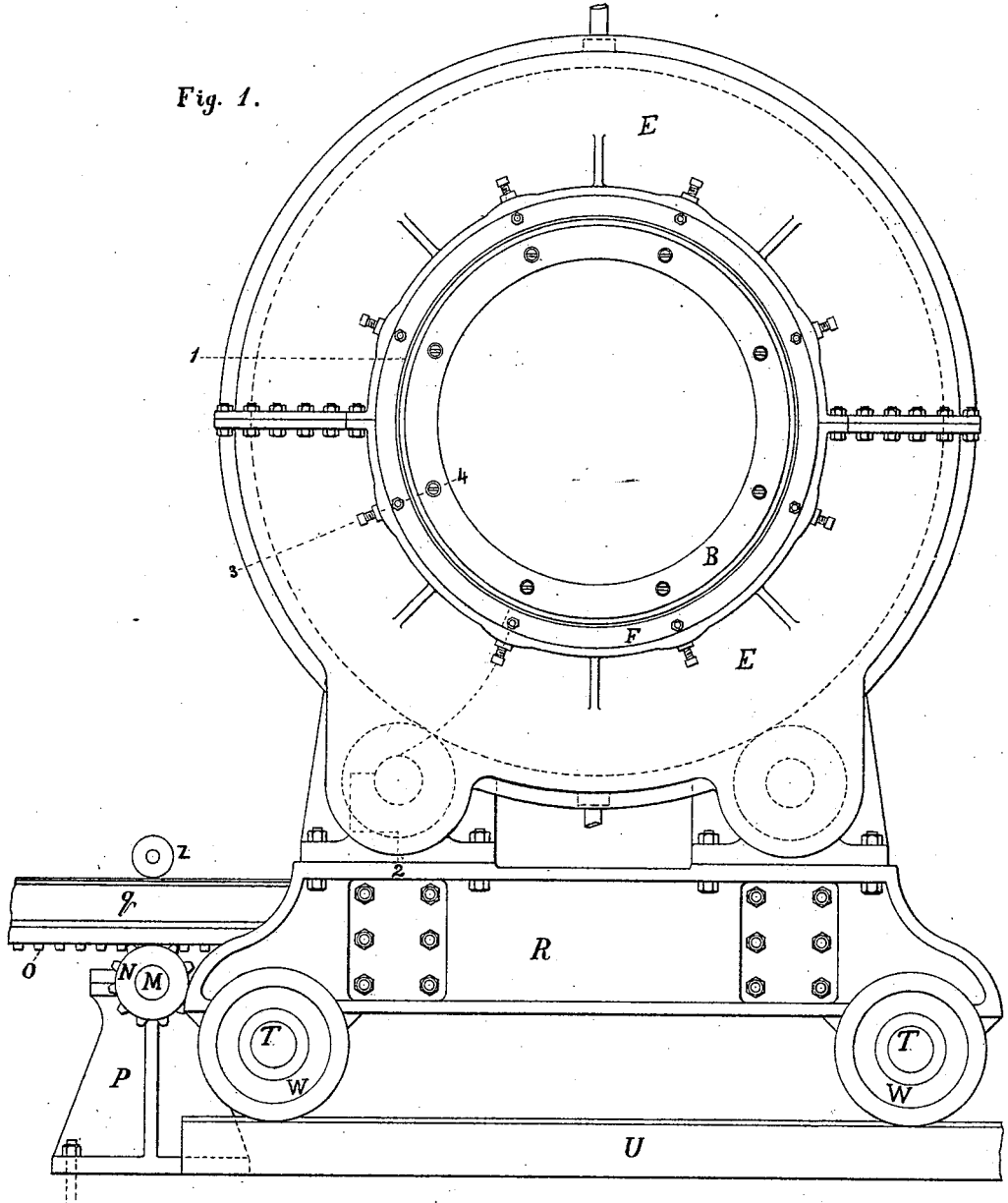
Figure 2:
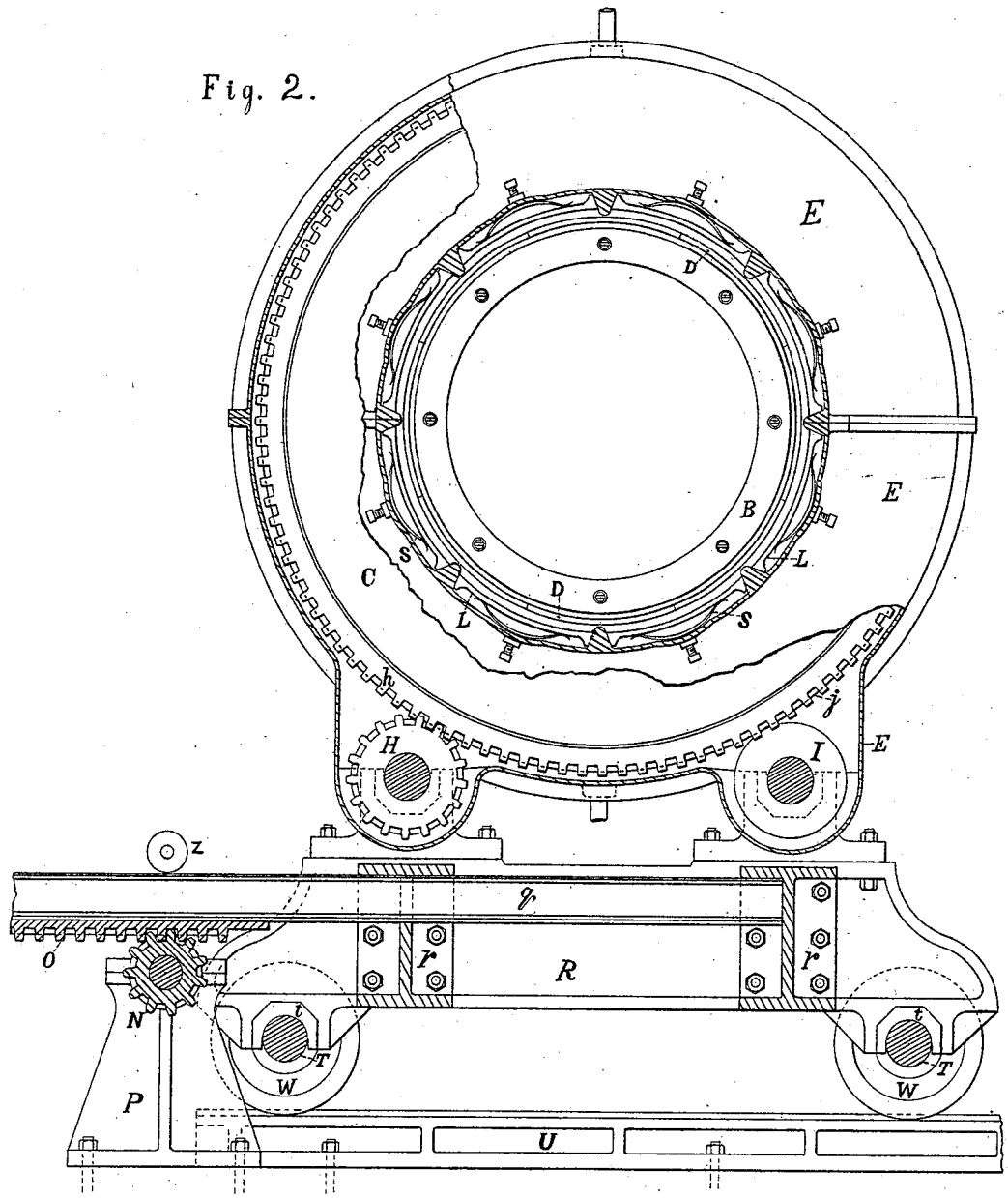
Figure 3:
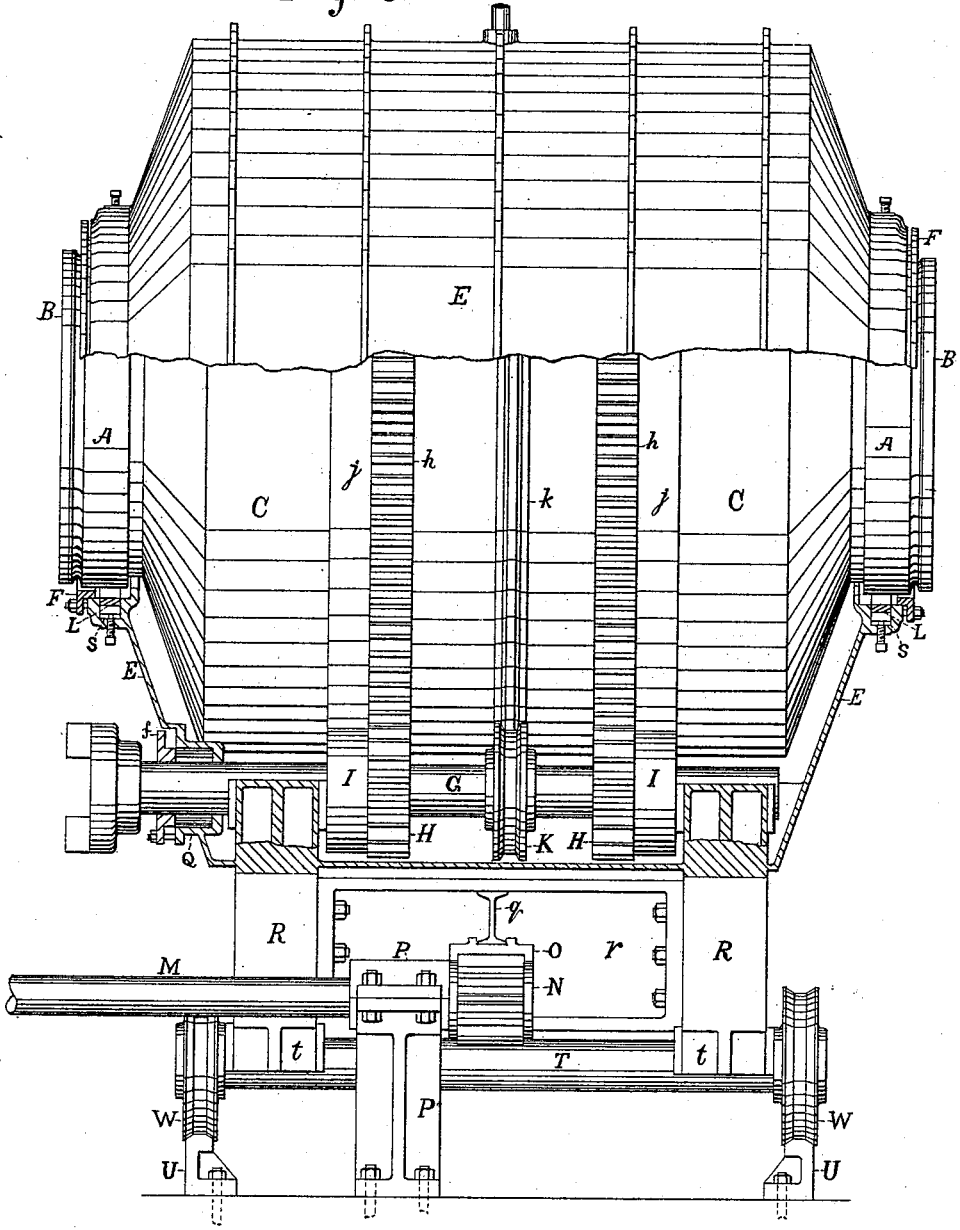
Figure 4:
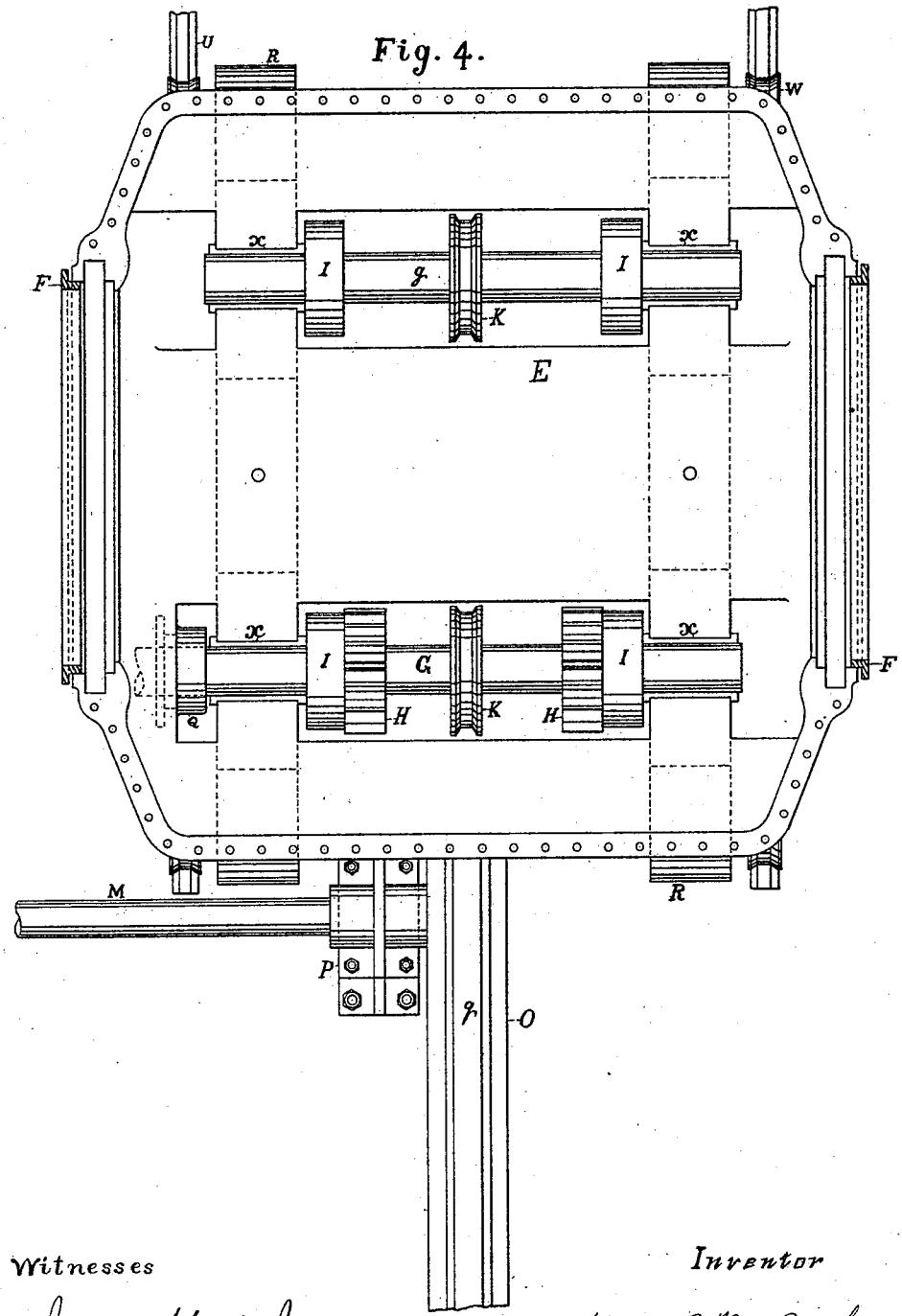
Figure 5:
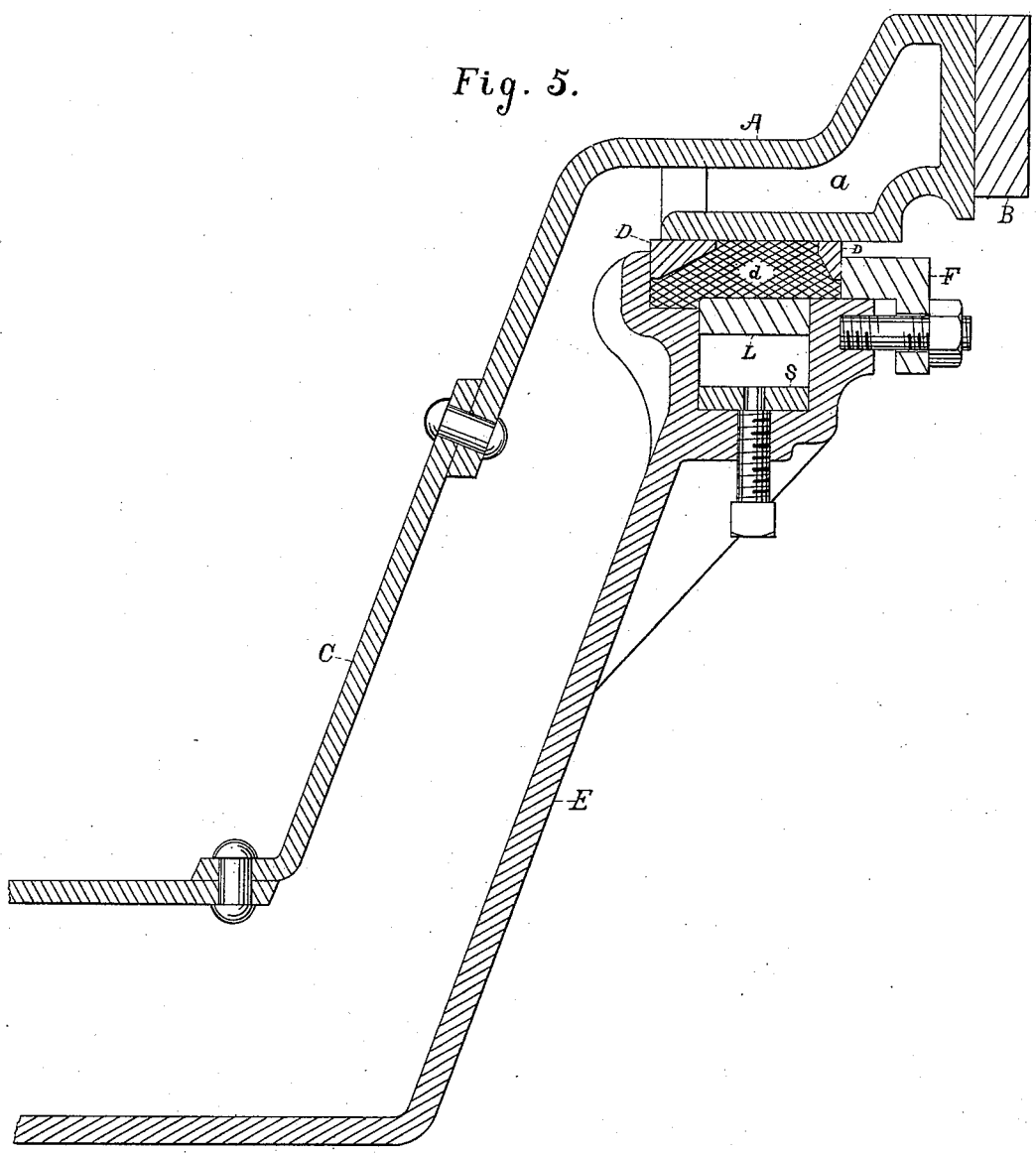

In the accompanying drawings, Figure 1, Sheet 1, is a side elevation of my improved puddling-machine, showing an outside view of the side of the frame and running-gear, and an end view of the casing and cylinder, which is placed at right angle with the frame, and firmly secured thereto. Fig. 2, Sheet 2, is a sectional elevation, with a portion of the casing or water-jacket broken off to reveal the revolving cylinder inside and the gearing for operating it, also a sectional view of the annular space for the packing around the neck of the cylinder, exposing the springs and segments for setting up the packing and adjusting it to the expansion and contraction of the neck of the revolving cylinder without impairing the efficiency of the packing. Fig. 3, Sheet 3, is an end elevation, with a portion of the casing removed and sectioned on the line 1 2, Fig. 1, Sheet 1, giving an external end view of the frame and running-gear, and a longitudinal view of a portion of the cylinder, and an outside view of the upper portion of the casing, and showing, in section, the annular space at each end for receiving the packing with the segments, springs, and glands in place. Fig. 4, Sheet 4, is a plan or top view of the lower half of the casing, pocketed near the base a short distance each side of the center for the reception of the shafts and rollers, and the pinions for revolving the cylinder when it is in place and resting upon the rollers. One shaft extends through the casing to connect with the motive power; also a portion of the shaft and gearing for moving the machine back and forth on the track or rails beneath. Fig. 5, Sheet 5, is an enlarged section of a portion of a cylinder and casing, packing, and gland at 3 4, Fig. 1, Sheet 1, giving a clear view of the relation of the several parts to each other.

I construct a revolving cylindrical puddling-chamber, C, in the ordinary manner, with contracted ends having large circular openings, but with this exception: I make the circular rings A A, forming the openings at the ends double or collared rings, leaving a space for water (marked *a*, Fig. 5, Sheet 5) between the rings, being closed at the extremity and open to the water-space inside the stationary casing E. The external surface of the collar is made true and smooth, so as to revolve easily and not injure the rings and packing D *d* used for the purpose of preventing the escape of water between the collar and casing. The supplementary rings, B B, are facing-rings to form the joints and take the wear against corresponding rings, which are placed at the mouth of a suitable furnace at one end for generating heat, and a flue at the opposite end for conveying away the products of combustion. The puddling-chamber, when in operation, is in position between the mouth of the furnace and the opening to the flue, so as to allow the flame and heat generated in the furnace to pass directly through the revolving chamber containing the iron in the process of puddling. When the puddling is completed, the machine is removed from the range of the furnace, in order to withdraw the mass of puddled iron. The chamber C must be lined with refractory material for the protection of the cylinder and for the retention of heat. It is necessary that the exterior of the cylinder be kept at a low temperature, so as not to be injured by the intense heat required for puddling the iron. This I accomplish by placing the cylinder C inside of a casing or water-jacket, E, sufficiently large to allow ample space between the cylinder and casing for a quantity of water, the water being admitted or forced into this space through one or more openings at the bottom of the casing, and allowed to escape through an opening at the top of the casing and conveyed away by a suitable pipe. Thus the cold water from beneath is constantly forcing out the heated water at the top. The circulating water is also agitated by the revolving motion of the cylinder, and the cylinder is thus preserved from overheating.

The casing E, I construct in halves—lower and upper—so as to allow placing the revolving cylinder inside. The casing may be made in several parts for the convenience of casting; but it is requisite that it should be water-tight. The joints must be close-fitting and securely bolted together. The ends of the casing are made annular, and provided with recesses for the reception of suitable packing material to form water-tight joints around the necks of the puddling-chamber when in place. The packing is held in place by a circular flanged ring or gland, F, bolted or screwed down by means of studs in a well-known manner. As the cylinder expands greatly when heated and contracts when cooling, it is highly important that the annular openings at the ends of the casing and the packing appliances contained therein, through which the cylinder ends extend, should be so constructed as to accommodate this expansion and contraction. For this purpose I make the gland F (see Fig. 5, Sheet 5) of a larger inside diameter than the outside diameter of the collar around the neck of the cylinder, the inside flange of the packing-recess having a corresponding opening. In order to prevent the fibrous or other material $d$ from passing through or getting into these open joints, I use the metal rings D D, which are cut into several sections, so as to yield to the expansion and contraction of the cylinder-necks. The segments L L surrounding the fibrous or other packing have parallel ends, and are acted upon by the springs S S, which yield to the expansion of the cylinder, and in turn force the packing toward the collars, when they again contract. As the packing wears, the springs are set inward by the adjusting-screws, to compensate for the portion worn away. The motive-power for operating the cylinder is communicated to the shaft G, which extends through the casing, and is transmitted to the cylinder by means of the pinions H H and cogged bands $h\ h$. The cylinder may be operated with one pinion and one band; but two of each are preferable, as, by alternating the cogs, there is less jarring. Four plain rollers, I I, for supporting the cylinder are secured to the shafts G G. The corresponding plain bands, $j\ j$, around the cylinder ride upon the rollers I I. The grooved rollers K K and the corresponding band, $k$, are for the purpose of keeping the cylinder in a central position and dividing the expansion. The rollers K K and band $k$ are not close fitting, as some lateral motion is required for adjusting the cylinder ends to the furnace and flue. At the point where the shaft pierces the casing is provided a stuffing-box, Q, and gland $f$, to prevent the leakage of water around the shaft. The frame composed of the side plates, R, and girts $r\ r$ is made of sufficient strength for the purpose, and with suitable bearings, $t\ t$, to rest upon the axles T T, which have secured to them grooved or flanged wheels W W to roll upon the track or rails U U, in order that the machine may move in a right line. A beam or bar, $q$, is secured in the center of the frame, to which is attached the rack O for moving the machine to and from the furnace when motive-power is transmitted through the shaft M and pinion N. The small roller Z, attached to an arm or stand which is secured to the pedestal P, keeps the rack and pinion in gear. The rails U U and pedestal P are bolted securely to a suitable foundation.

It should be known that iron puddled by machinery operated by motive-power is greatly superior to that puddled by hand-labor. The labor of puddling by hand being severe and exhaustive, the amount of stirring required to make good puddled iron cannot be so well performed by occasional effort, as in hand-puddling, as it can by a revolving chamber which moves continuously, causing the metal to undergo a constant agitation.

Another great advantage of a revolving chamber consists in the fact that the flame impinges strongest against the lining of the chamber which is uppermost, and which is constantly moving downward and under the molten iron, thereby conveying additional heat beneath the mass of iron where it is most advantageous in hastening the process of puddling.

I claim as my invention—

1. A revolving puddling-chamber having annular collared necks around the openings, the collars forming wearing-surfaces for the annular packing that is contained in the recessed ends of the stationary casing, said collars terminating within the space inclosed between the chamber and casing, thereby securing an unobstructed circulation of water against the external surface of the puddling-chamber, substantially as shown and described.

2. A stationary casing or water-jacket surrounding and inclosing the body of a revolving puddling-chamber, substantially as shown and described.

3. A stationary casing or water-jacket having annular packing-spaces and packing appliances at the ends adapted to the expansion and contraction of a revolving puddling-chamber, and in combination therewith, substantially as shown and described.

4. The water-jacket E, with the shafts G $g$, rollers I I, pinions H H, and bearings $x\ x$ placed therein, and the stuffing-box Q and gland $f$, in combination with a revolving puddling-chamber, substantially as shown and described.

5. The circular flanged ring or gland F, segments L L, springs S S, sectional rings D D, and packing $d$, in combination with a stationary casing and revolving puddling-chamber, substantially as shown and described.

HENRY B. VAN BENTHUYSEN.

Witnesses:
JESSE HALL, Jr.,
JAMES W. PENNYPACKER.